US005165158A

United States Patent [19]

Markisello

[11] Patent Number: 5,165,158

[45] Date of Patent: Nov. 24, 1992

[54] METHOD FOR REMOVING CYLINDER PLUGS FROM GLOVE BOXES IN ALL VEHICLES

[76] Inventor: Frank Markisello, 91-10 Liberty Ave., Ozone Park, N.Y. 11417

[21] Appl. No.: 840,189

[22] Filed: Feb. 24, 1992

[51] Int. Cl.[5] ............ B23P 19/04

[52] U.S. Cl. ............ 29/426.5; 29/249; 29/256; 29/270

[58] Field of Search ............ 29/426.1, 426.5, 214, 29/215, 249, 256, 258, 259, 261, 264, 270, 281.6

[56] References Cited

U.S. PATENT DOCUMENTS 4,304,035 12/1981 Ecker ............ 29/249

FOREIGN PATENT DOCUMENTS 606640 12/1934 Fed. Rep. of Germany ............ 29/259

*Primary Examiner*—Timothy V. Eley

[57] ABSTRACT

A method of removing cylinder plugs from glove box locks in all vehicles which use this system. Consists of using a tool assembly which has two holes to hold onto the lock case, a knob at the top for turning the threaded tappered shaft so the fingers will spread the cylinder plug holding tabs, releasing the cylinder plug so the threaded tappered shaft can travel further down, pushing the cylinder plug out of the lock case.

1 Claim, 2 Drawing Sheets

METHOD FOR REMOVING CYLINDER PLUGS FROM GLOVE BOXES IN ALL VEHICLES

BACKGROUND OF THE INVENTION

1. Field of Invention

The instant invention relates generally to lock cylinders and more specifically it relates to a method of removing cylinder plugs from glove boxes in all vehicles.

2. Description of the Prior Art

Numerous lock cylinders have been provided in the prior art that are adapted to be used in all vehicles glove box locks. There is nothing on the market today that will enable you to remove these cylinder plugs.

Since there is no prior art units suitable for the particular purpose stated above, there is a need for the present invention as heretofore described.

A principle object of the present invention is to provide a method of removing cylinder plugs from glove boxes in all vehicles which incorperate these cylinder plugs.

By utilizing a tool which has two holes, one on each side of the tool, these holes will allow the two locking plungers located on the lock case to slide into these holes, now holding tool securely to lock case. Flip tool up, the two thin shims located at the tips of the two fingers will slide between the cylinder plug holding tabs and the cylinder plug. Then just turn the knob located at the top of the tool, the threaded tappered shaft will start to move down. The tappered end of this shaft will cause the two fingers to spread apart causing the two thin shims at the tips of the fingers to spread the cylinder plug holding tabs. When these tabs are spread enough to release the cylinder plug, the end of the threaded tappered shaft will push the cylinder plug out of the lock case.

A further object is to provide a method of removing cylinder plugs from all vehicles, whereby the tool is economical to manufacture.

A still further object, is to provide a method of removing cylinder plugs from all vehicles where the tool is simple and easy to use.

To the accomplishment of the above and related object, this invention may be embodied in form illustrated in the accompanying drawings, attention being called to the fact however, that the drawings are illustrative only, and that changes may be made in specific construction illustrated and described within the scope of the appended claims.

DETAILED DESCRIPTION OF THE PREFERRED EMBODIMENTS

Figure 4:
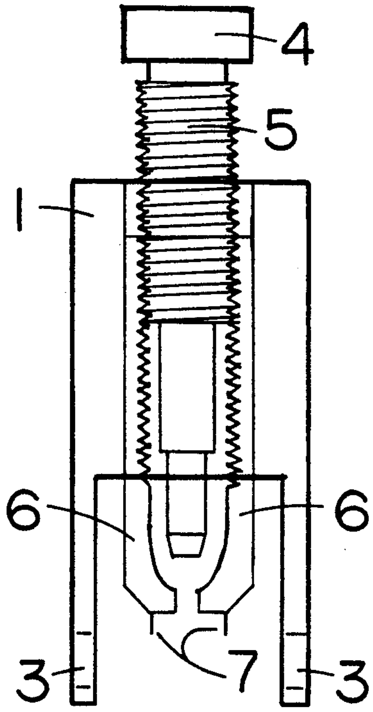
FIGS. 4 and 5 show views of the tool assembly.
Figure 5:
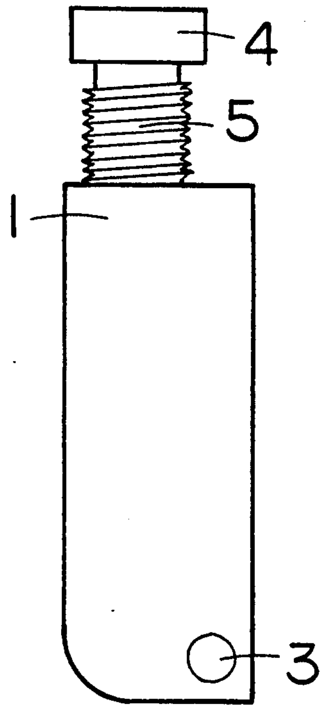

Turning now descriptively to the drawing in which similar reference characters denote similar elements through out the several views. FIGS. 4 and 5 best illustrate the basic parts of the invention, being a tool assembly in one unit.

FIG. 4 being a front view of tool assembly 1, consisting of a turn knob 4, a threaded tappered shaft 5, two fingers 6, two thin shims 7, two holes 3.

FIG. 5 being a side view of tool assembly 1, turn knob 4, threaded tappered shaft 5, and two holes (3) one on each side of the tool assembly.

Figure 1:
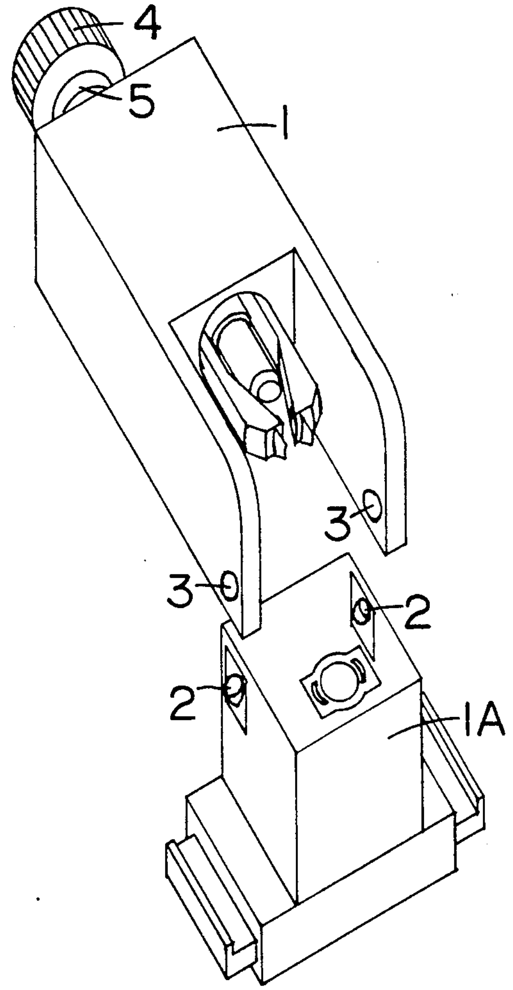
FIG. 1 is an exploded perspective view of the tool being slid over lock case, in line with lock locking plungers, so they will slide into the two holes on the tool.
Figure 2:
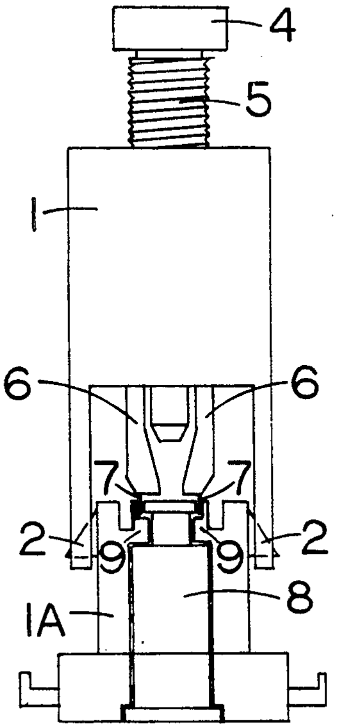
FIG. 2 is an exploded perspective view of the tool hooked onto lock case and being flipped up, allowing the two thin shims located at the end of the two fingers to slide between the cylinder plug and the cylinder plug holding tabs.
Figure 3:
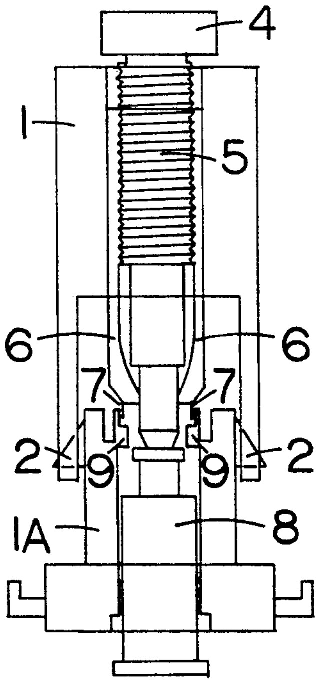
FIG. 3 is an exploded perspective view of the tool in place, the turning knob is at the top of the tool, the threaded tappered shaft is moving down and the tappered end of the shaft is causing the two fingers to spread apart. This causes the two thin shims at the end of the fingers to spread the cylinder plug holding tabs, thus releasing the cylinder plug. At this moment, the threaded tappered shaft will go down even further, pushing the cylinder plug out of the lock case.

To understand how the tool assembly 1 is used, the following steps are described and illustrated in FIGS. 1 through 3: for removing cylinder plugs from glove boxes from all vehicles using this type of system.

1. Slide tool assembly 1 over lock case 1A, so the two holes 3, go over the two locking plungers 2, which will slide into the two holes 3, now holding tool assembly 1 onto the lock case 1A.

2. Flip tool assembly 1 up, the two thin shims 7 will slide between the cylinder plug 8 and the cylinder plug holding tabs 9.

3. Turn the turn knob 4, this will drive the threaded tappered shaft 5 down, spreading the two fingers 6. In turn, the two thin shims 7, will spread the two cylinder plug holding tabs 9, releasing the cylinder plug 8. At this moment the threaded tappered shaft 5, will push the cylinder plug 8 out of the lock case 1A.

What is claimed is:

1. In a method of removing a cylinder plug from a glove box lock, the glove box lock comprising a lock case, a lock assembly, locking plungers, and cylinder plug holding tabs; by using a tool assembly; the tool assembly having two oppositely opposed fingers mounted thereon, each finger having a thin shim mounted at an end thereof, and a tapered shaft mounted on the tool assembly between the fingers; the method comprising the steps of:

(a) sliding the tool assembly over the lock case and holding the lock assembly in place by the locking plungers;

(b) flipping the tool assembly thereby sliding each thin shim between the cylinder plug and one of the holding tabs;

(c) moving the shaft towards the fingers thereby spreading the fingers causing the shims to move the cylinder plug holding tabs outwardly thereby releasing the cylinder plug; and (d) continuing to move the shaft towards the cylinder plug thereby pushing the cylinder plug out of the lock case.

* * * * *